(12) United States Patent
Tang

(10) Patent No.: US 6,776,085 B1
(45) Date of Patent: Aug. 17, 2004

(54) COOKING DEVICE WITH A TRAY UNIT HAVING TWO TRAY HALVES PIVOTED TO EACH OTHER

(75) Inventor: Wen-Yi Tang, Tainan (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/729,641

(22) Filed: Dec. 5, 2003

(51) Int. Cl.$^7$ .......................... A47J 37/00; A47J 37/06; A47J 37/10; H05B 1/00; H05B 3/06

(52) U.S. Cl. .................. 99/375; 99/349; 99/380; 99/400; 99/425; 99/446; 219/386; 219/524

(58) Field of Search .................. 99/339, 340, 331–333, 99/349, 372–384, 400, 401, 422, 425, 444–450; 219/524, 525, 401, 521, 386, 415, 461, 450.1; 126/20, 369; 426/523, 510

(56) References Cited

U.S. PATENT DOCUMENTS

| | | | | |
|---|---|---|---|---|
| 3,377,942 A | * | 4/1968 | Carbon | 99/376 |
| 4,011,431 A | * | 3/1977 | Levin | 219/524 |
| 4,091,720 A | * | 5/1978 | Wheeler | 99/375 |
| 4,178,500 A | * | 12/1979 | Brindopke | 219/524 |
| 4,206,345 A | * | 6/1980 | Maass et al. | 219/524 |
| 4,987,827 A | * | 1/1991 | Marquez | 99/331 |
| 5,363,748 A | * | 11/1994 | Boehm et al. | 99/372 |
| 5,606,905 A | * | 3/1997 | Boehm et al. | 99/375 |
| 5,615,604 A | * | 4/1997 | Chenglin | 99/332 |
| 6,016,741 A | * | 1/2000 | Tsai et al. | 99/341 |
| 6,170,389 B1 | * | 1/2001 | Brady | 99/332 |
| 6,269,738 B1 | * | 8/2001 | Huang | 99/375 |
| 6,397,730 B1 | * | 6/2002 | Steinbach et al. | 99/331 |

* cited by examiner

Primary Examiner—Timothy F. Simone
(74) Attorney, Agent, or Firm—Ladas & Parry

(57) ABSTRACT

A cooking device includes a pivot unit disposed below and interconnecting pivotally bottom surfaces of two tray halves of a tray unit to permit pivotal movement of the tray halves between extended and folded positions. The tray halves have inner sides contacting each other and defining a seam therebetween, and top surfaces flush with each other for providing a large cooking area when the tray halves are disposed at the extended position. An oil-collecting member is mounted on the bottom surface of one of the tray halves, and spans the width of the seam for collecting oil that permeates through the seam.

9 Claims, 5 Drawing Sheets

COOKING DEVICE WITH A TRAY UNIT HAVING TWO TRAY HALVES PIVOTED TO EACH OTHER

BACKGROUND OF THE INVENTION

1. Field of the Invention

The present invention relates to a cooking device, more particularly to a cooking device with two tray halves pivoted to each other in such a manner as to provide a large cooking area when the cooking device is disposed at an extended position and to occupy a small storage space when the cooking device is disposed at a folded position.

2. Description of the Related Art

A conventional cooking device includes a cooking plate having a top surface defining a cooking area thereof. The larger the cooking area, the bigger will be the dimension of the cooking plate, thereby inconveniencing the user to store or carry the same.

SUMMARY OF THE INVENTION

Therefore, the object of this invention is to provide a cooking device with a tray unit having two tray halves pivoted to each other in such a manner as to provide a large cooking area when the cooking device is disposed at an extended position and to occupy a relatively small storage space when the cooking device is disposed at a folded position, thereby overcoming the aforesaid disadvantage of the prior art.

According to the present invention, a cooking device includes: a tray unit having first and second tray halves, each of which includes a cooking plate that has opposite top and bottom surfaces, opposite front and rear sides, an inner side extending between the front and rear sides, and an outer side opposite to the inner side; a pivot unit disposed below and interconnecting pivotally the bottom surfaces of the cooking plates of the first and second tray halves in such a manner as to permit pivotal movement of the first and second tray halves relative to each other between an extended position, in which the inner sides of the cooking plates of the first and second tray halves substantially contact each other to define a seam therebetween, and a folded position, in which the inner sides of the cooking plates of the first and second tray halves are spaced apart from each other; and an oil-collecting member mounted on the bottom surface of the cooking plate of one of the first and second tray halves and spanning the width of the seam for collecting oil that permeates through the seam when the first and second tray halves are disposed at the extended position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
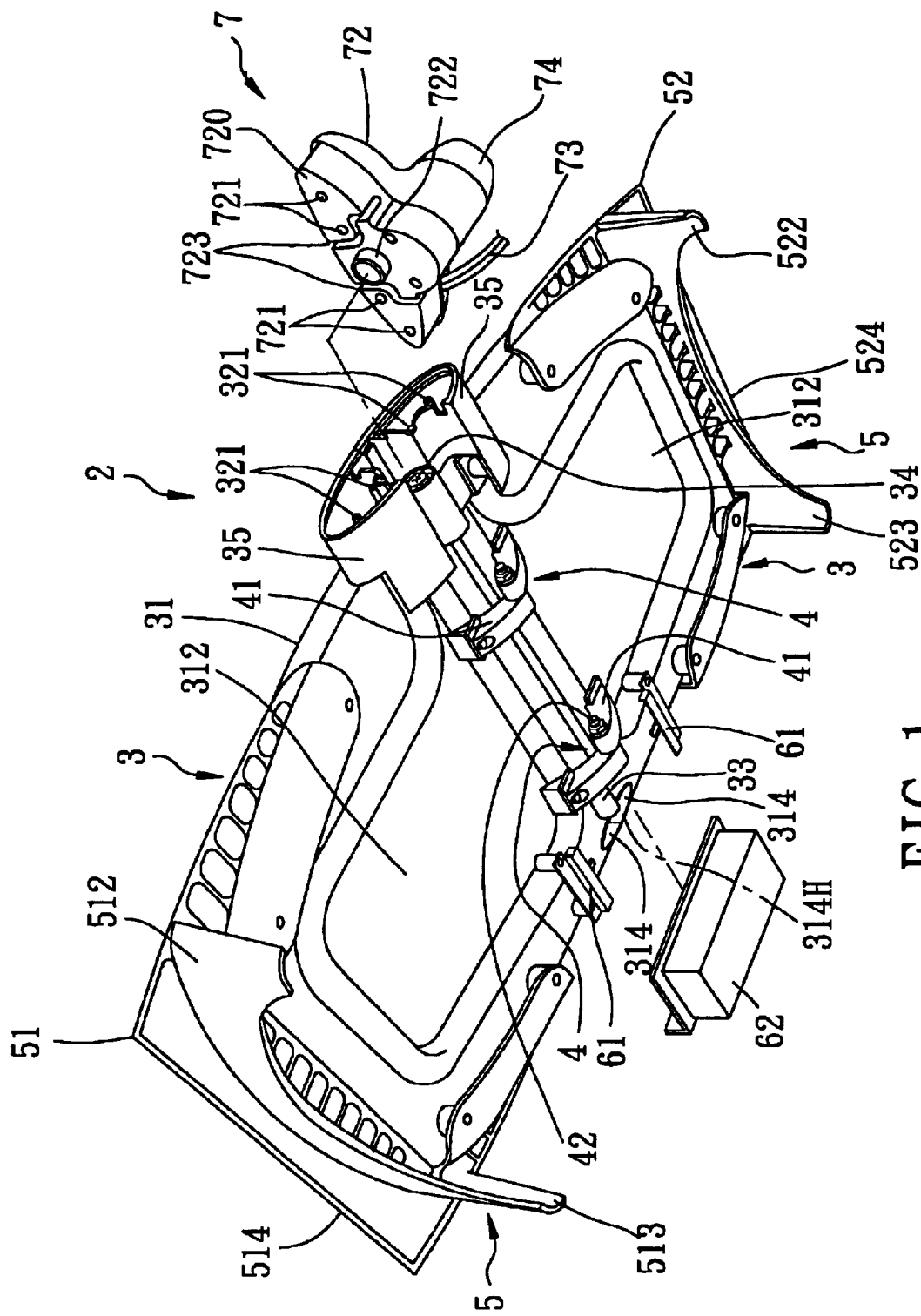
FIG. 1 is an exploded perspective bottom view of the preferred embodiment of a cooking device according to the present invention.
Figure 2:
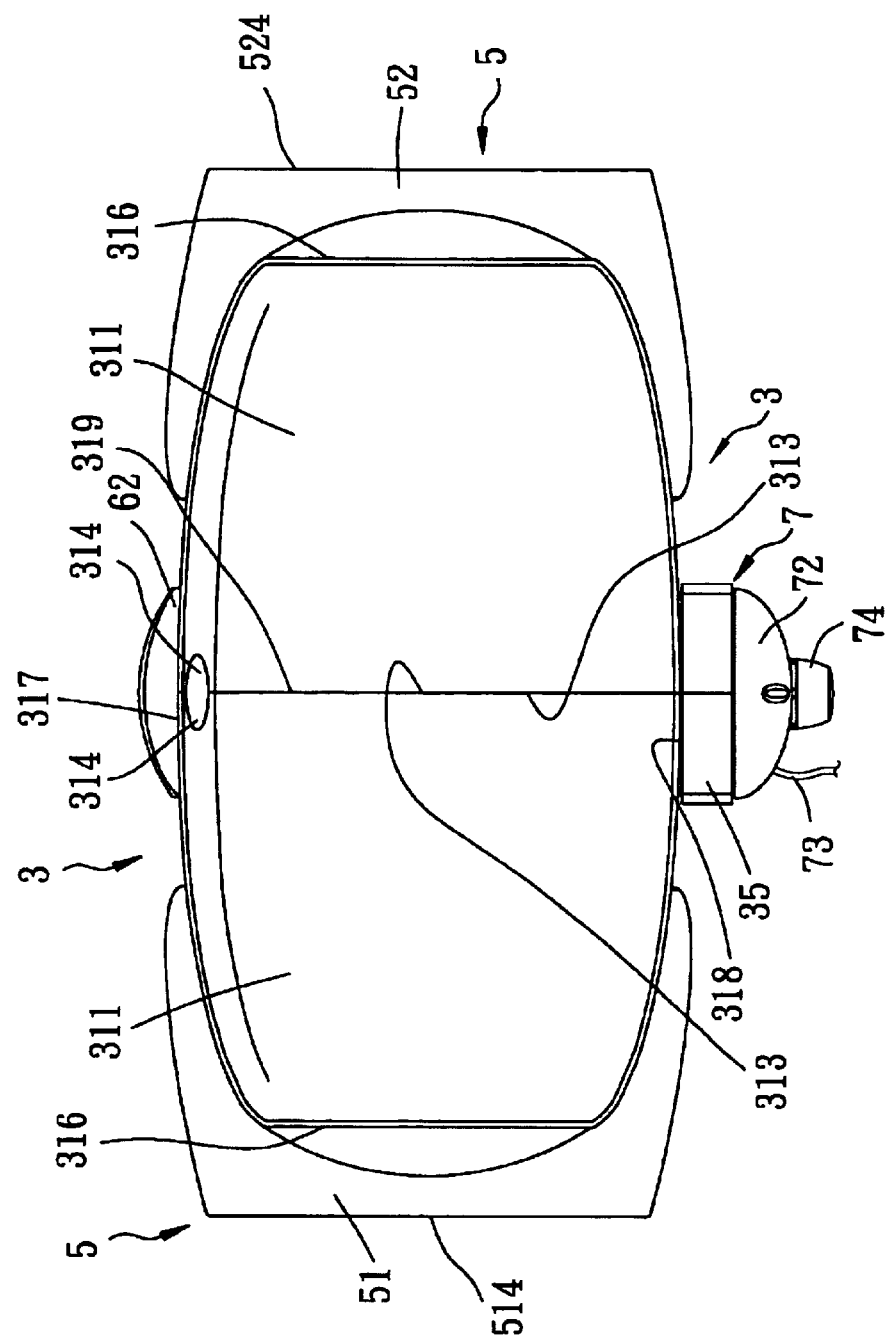
FIG. 2 is a top planar view of the preferred embodiment at an extended position.
Figure 3:
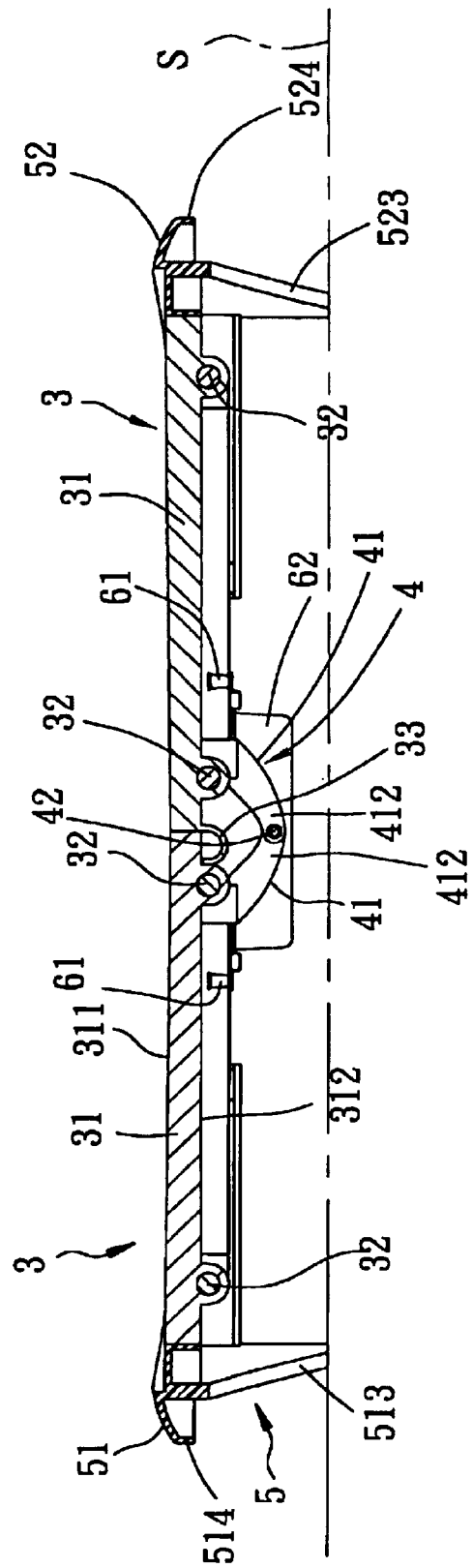
FIG. 3 is a sectional view of the preferred embodiment at the extended position.

Referring to FIGS. 1 to 3, the preferred embodiment of a cooking device according to the present invention is shown to include a tray unit having first and second tray halves 3, a pivot unit 4, an oil-collecting member 33, and a support unit 5.

As illustrated, each of the first and second tray halves 3 includes a cooking plate 31 and a socket half 35. The cooking plate 31 has opposite top and bottom surfaces 311,312, opposite front and rear sides 317,318, an inner side 313 extending between the front and rear sides 317,318, and an outer side 316 opposite to the inner side 313.

Figure 4:
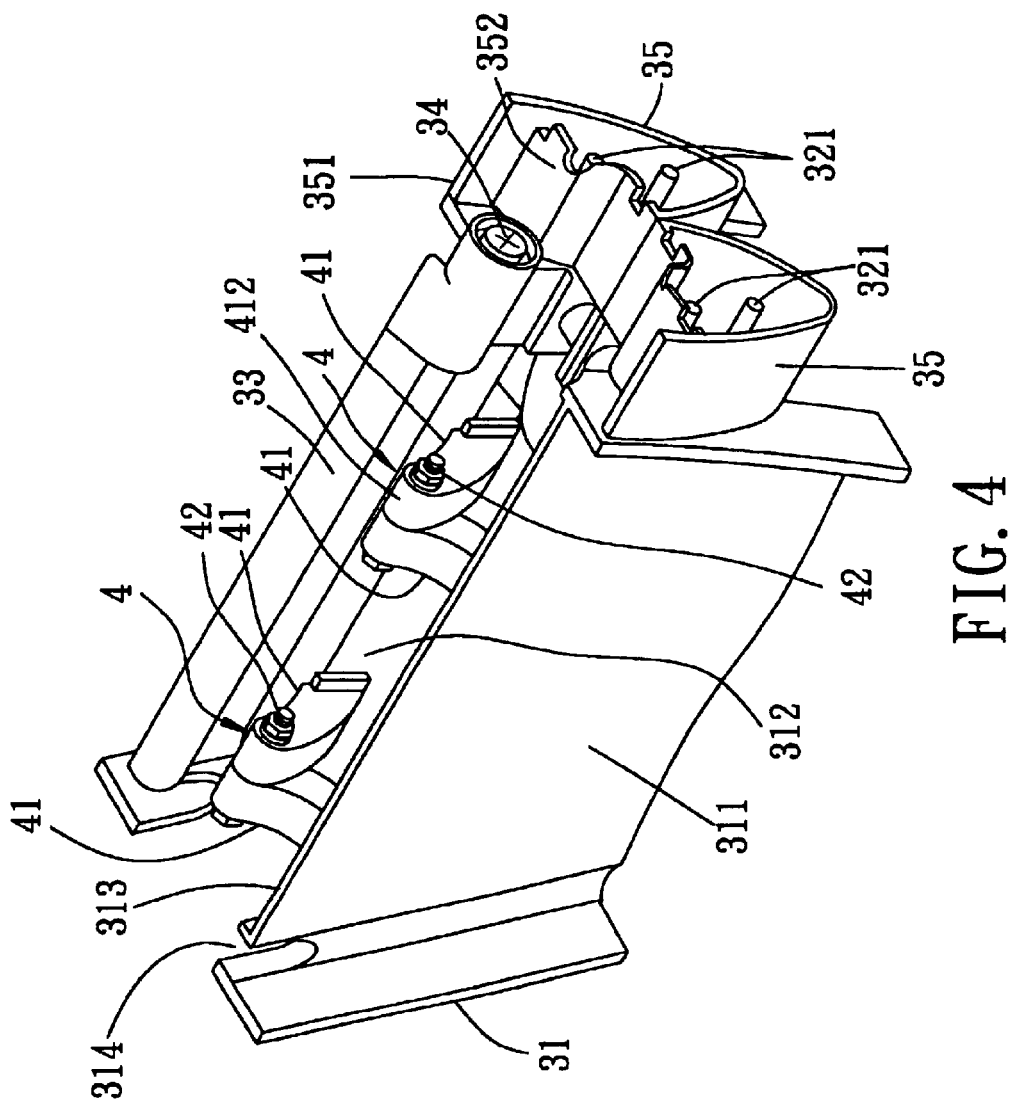
FIG. 4 is a fragmentary perspective view of the preferred embodiment at a folded position.
Figure 5:
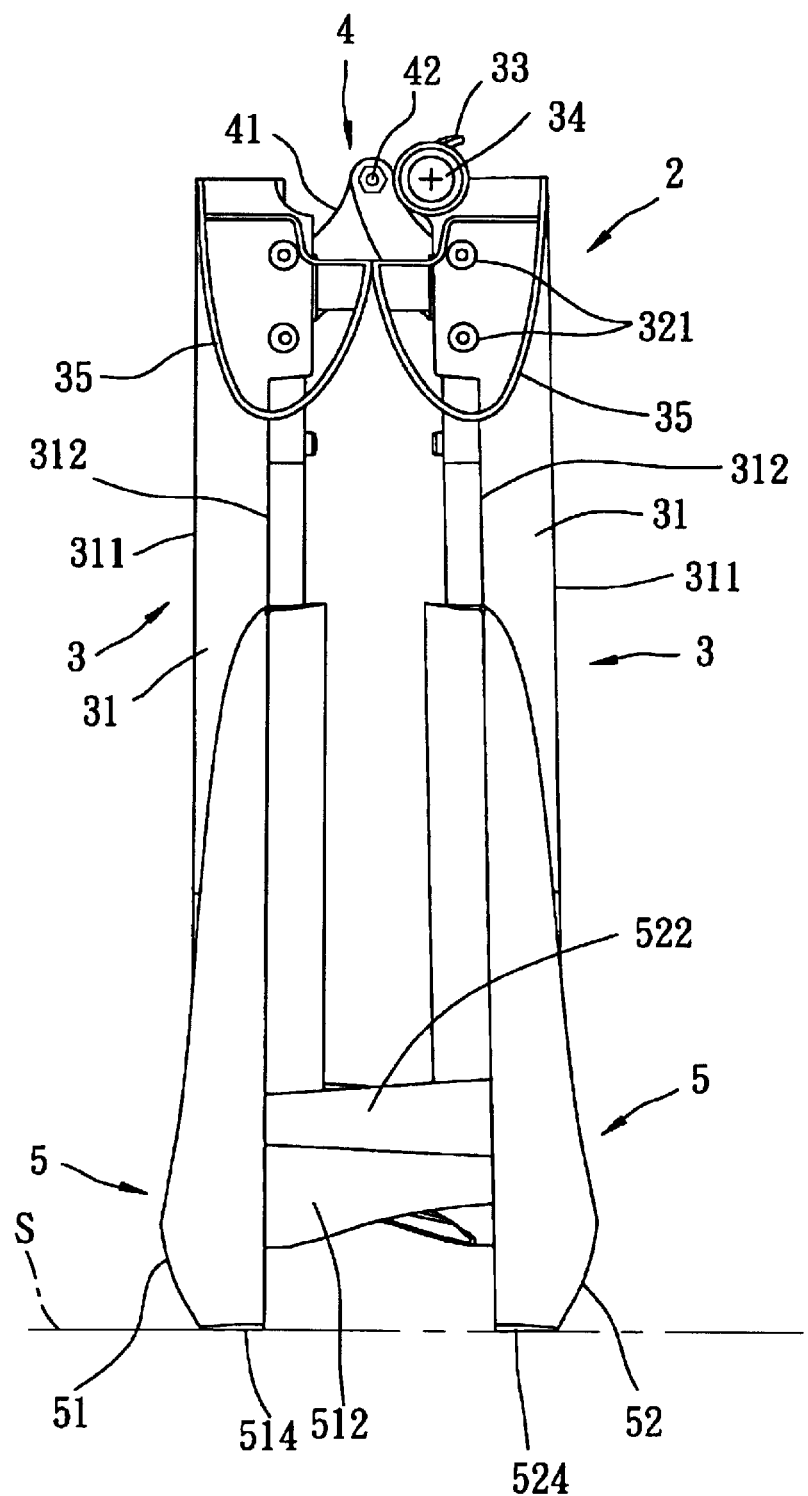
FIG. 5 is a side view of the preferred embodiment at the folded position.

The pivot unit 4 is disposed below and interconnects pivotally the bottom surfaces 312 of the cooking plates 31 in such a manner as to permit pivotal movement of the first and second tray halves 3 relative to each other between an extended position, in which the inner sides 313 of the cooking plates 31 of the first and second tray halves 3 substantially contact each other to define a seam 319 therebetween (see FIG. 2) and in which the top surfaces 311 of the cooking plates 31 of the first and second tray halves 3 are flush with each other (see FIG. 3), and a folded position, in which the inner sides 313 of the cooking plates 31 of the first and second tray halves 3 are spaced apart from each other (see FIG. 4), and in which the bottom surfaces 312 of the cooking plates 31 of the first and second tray halves 3 face toward each other (see FIG. 5).

The oil-collecting member 33 is mounted on the bottom surface 312 of one of the cooking plates 31 of the first and second tray halves 3 and spans the width of the seam 319 for collecting oil that permeates downward through the seam 319 when the first and second tray halves 3 are disposed at the extended position.

The pivot unit 4 includes two pairs of first and second lugs 41, and two pivot shafts 42. Each pair of the first and second lugs 41 project curvedly and respectively from the bottom surfaces 312 of the cooking plates 31 of the first and second tray halves 3 toward each other and intersect each other. Each of the pivot shafts 42 extends through an intersection of a respective pair of the first and second lugs 41 so as to permit rotation of the first and second tray halves 3 about the pivot shafts 42 relative to each other.

The support unit 5 includes first and second transverse stands 51,52, and first and second lateral stands 514,524. The first and second transverse stands 51,52 are disposed respectively adjacent to the outer sides 316 of the first and second tray halves 3, extend transversely and respectively from the bottom surfaces 312 of the cooking plates 31 of the first and second tray halves 3, and are adapted to stand on a surface (S) (see FIG. 3) of a cooking site when the first and second tray halves 3 are disposed at the extended position. The first and second lateral stands 514,524 of the support unit 5 extend laterally and respectively from the outer sides 316 of the first and second tray halves 3, and are adapted to stand on the surface (S) of the cooking site when the first and second tray halves 3 are disposed at the folded position (see FIG. 5). The first transverse stand 51 includes first front and rear legs 513,512. The second transverse stand 52 includes second front and rear legs 523,522. When the first and second tray halves 3 are disposed at the folded position, the first front leg 513 is juxtaposed with and overlaps the second front leg 523, whereas the first rear leg 512 is juxtaposed with and overlaps the second rear leg 522.

In this preferred embodiment, an oil reservoir 62 is mounted detachably on the bottom surfaces 312 of the cooking plates 31 of the first and second tray halves 3, and is connected to the oil-collecting member 33 in such a manner as to receive oil therefrom. Preferably, two mounting seats 61, that are respectively fixed to the bottom surfaces 312 of the cooking plates 31, are provided for securing the oil reservoir 62 to the cooking plates 31. Preferably, the inner side 313 of the cooking plate 31 of each of the first and second tray halves 3 is formed with a recess 314 adjacent to the front side 317 of a respective one of the first and second tray halves 3. The recesses 314 in the inner sides 313 of the first and second tray halves 3 cooperatively define an oil dripping hole (314H) (see FIG. 1) when the first and second tray halves 3 are disposed at the extended position. The oil dripping hole (314H) is registered vertically with the oil reservoir 62. The oil-collecting member 33 can be arranged in such a manner as to incline gradually and downwardly from the rear side 318 to the front side 317 of the corresponding cooking plate 31 to facilitate oil flow from the oil-collecting member 33 to the oil reservoir 62.

Each of the first and second tray halves 3 is further formed with a heating member 32 that is mounted on the bottom surface 312 of the respective cooking plate 31 thereof for heating the respective cooking plate 31 and that has a pair of electrical terminals 321 protruding outwardly from the rear side 318 of a respective one of the first and second tray halves 3. The socket half 35 is mounted on the rear side 318 of the cooking plate 31 of the respective one of the first and second tray halves 3 in such a manner as to enclose the electrical terminals 321 therein. The socket half 35 has a mating end 351 and a partition 352 disposed therein. The mating ends 351 of the socket halves 35 of the first and second tray halves 3 contact each other to form a socket unit that defines a plug-inserting hole when the first and second tray halves 3 are disposed at the extended position. A heat conducting member 34 is mounted on the bottom surface 312 of one of the first and second tray halves 3, and is disposed between the partitions 352 of the socket halves 35.

A plug 7, together with a cable 73 and a temperature control 74, is provided for establishing electrical connection between the cooking device of the present invention and a power source (not shown). The plug 7 includes an insert seat 72 that is adapted to mate with the plug-inserting hole. The insert seat 72 is formed with a temperature sensing member 722 that projects outwardly therefrom and that is adapted to connect with the heat conducting member 34, and two pairs of terminal holes 721. The temperature control 74 is connected electrically to the temperature sensing member 722 for controlling or setting the temperature of the cooking plates 31 of the first and second tray halves 3. The insert seat 72 is further formed with two engaging slots 723 at two opposite sides of the temperature sensing member 722. When the insert seat 72 is inserted into the plug-inserting hole, the electrical terminals 321 of the heating members 32 extend respectively into the terminal holes 721 in the insert seat 72, and the temperature sensing member 722 is connected thermally to the heat conducting member 34 of the cooking device. In addition, the partitions 352 of the socket halves 35 extend respectively into the two engaging slots 723 of the insert seat 72 so as to provide firm connection between the cooking device of the present invention and the plug 7. Thus, electrical connection is established between the cooking device of the present invention with the power source (not shown).

Since the tray unit of the cooking device of this invention is foldable, the space required for storing the cooking device can be considerably reduced. Moreover, the design of the first and second transverse stands 51,52 permits the cooking device to be folded into a relatively compact form.

With this invention thus explained, it is apparent that numerous modifications and variations can be made without departing from the scope and spirit of this invention. It is therefore intended that the invention be limited only as indicated in the appended claims.

I claim:

1. A cooking device comprising:
    a tray unit having first and second tray halves, each of which includes a cooking plate that has opposite top and bottom surfaces, opposite front and rear sides, an inner side extending between said front and rear sides, and an outer side opposite to said inner side;
    a pivot unit interconnecting pivotally said first and second tray halves in such a manner as to permit pivotal movement of said first and second tray halves relative to each other between an extended position, in which said inner sides of said cooking plates of said first and second tray halves substantially contact each other to define a seam therebetween, and a folded position, in which said inner sides of said cooking plates of said first and second tray halves are spaced apart from each other; and
    an oil-collecting member mounted on said bottom surface of said cooking plate of one of said first and second tray halves and spanning the width of said seam for collecting oil that permeates through said seam when said first and second tray halves are disposed at said extended position.

2. The cooking device as defined in claim 1, wherein said pivot unit is disposed below said bottom surfaces of said cooking plates of said first and second tray halves and includes first and second lugs that project respectively from said bottom surfaces of said cooking plates of said first and second tray halves toward each other and that intersect each other, and a pivot shaft extending through an intersection of said first and second lugs so as to permit rotation of said first and second tray halves about said pivot shaft relative to each other, said top surfaces of said cooking plates of said first and second tray halves being flush with each other when said first and second tray halves are disposed at said extended position, said bottom surfaces of said cooking plates of said first and second tray halves facing toward each other when said first and second tray halves are disposed at said folded position.

3. The cooking device as defined in claim 1, further comprising a support unit including first and second transverse stands disposed respectively adjacent to said outer sides of said cooking plates of said first and second tray halves, extending transversely and respectively from said bottom surfaces of said cooking plates of said first and second tray halves, and adapted to stand on a surface of a site when said first and second tray halves are disposed at said extended position, said first transverse stand including first front and rear legs, said second transverse stand including second front and rear legs, said first front leg being juxtaposed with and overlapping said second front leg, whereas said first rear leg being juxtaposed with and overlapping said second rear leg when said first and second tray halves are disposed at said folded position.

4. The cooking device as defined in claim 3, wherein said support unit further includes first and second lateral stands extending laterally and respectively from said outer sides of said first and second tray halves, and adapted to stand on a surface of a site when said first and second tray halves are disposed at said folded position.

5. The cooking device as defined in claim 1, further comprising an oil reservoir connected to said oil-collecting member in such a manner as to receive oil therefrom.

6. The cooking device as defined in claim 5, further comprising two mounting seats that are respectively fixed to said bottom surfaces of said cooking plates of said first and second tray halves, said oil reservoir is mounted detachably on said bottom surfaces of said cooking plates of said first and second tray halves through said mounting seats.

7. The cooking device as defined in claim 5, wherein said inner side of said cooking plate of each of said first and second tray halves is formed with a recess adjacent to said front side of a respective one of said first and second tray halves, said recesses in said inner sides of said cooking plates of said first and second tray halves cooperatively defining an oil dripping hole when said first and second tray halves are disposed at said extended position, said oil dripping hole being registered vertically with said oil reservoir.

8. The cooking device as defined in claim 1, wherein each of said first and second tray halves is formed with a heating member for heating the respective one of said first and second tray halves, said heating member having a pair of electrical terminals protruding outwardly from said rear side of said cooking plate of the respective one of said first and second tray halves, each of said first and second tray halves being further formed with a socket half mounted on said rear side of said cooking plate of the respective one of said first and second tray halves in such a manner as to enclose said electrical terminals therein.

9. The cooking device as defined in claim 8, wherein said socket half has a mating end and a partition disposed therein, said mating ends of said socket halves of said first and second tray halves contacting each other to form a socket unit when said first and second tray halves are disposed at said extended position, said cooking device further comprising a plug with a cable, said plug being formed with two opposite engaging slots and being insertable into said socket unit so as to permit extension of said partitions of said socket halves into said engaging slots.

* * * * *